United States Patent Office 3,691,059
Patented Sept. 12, 1972

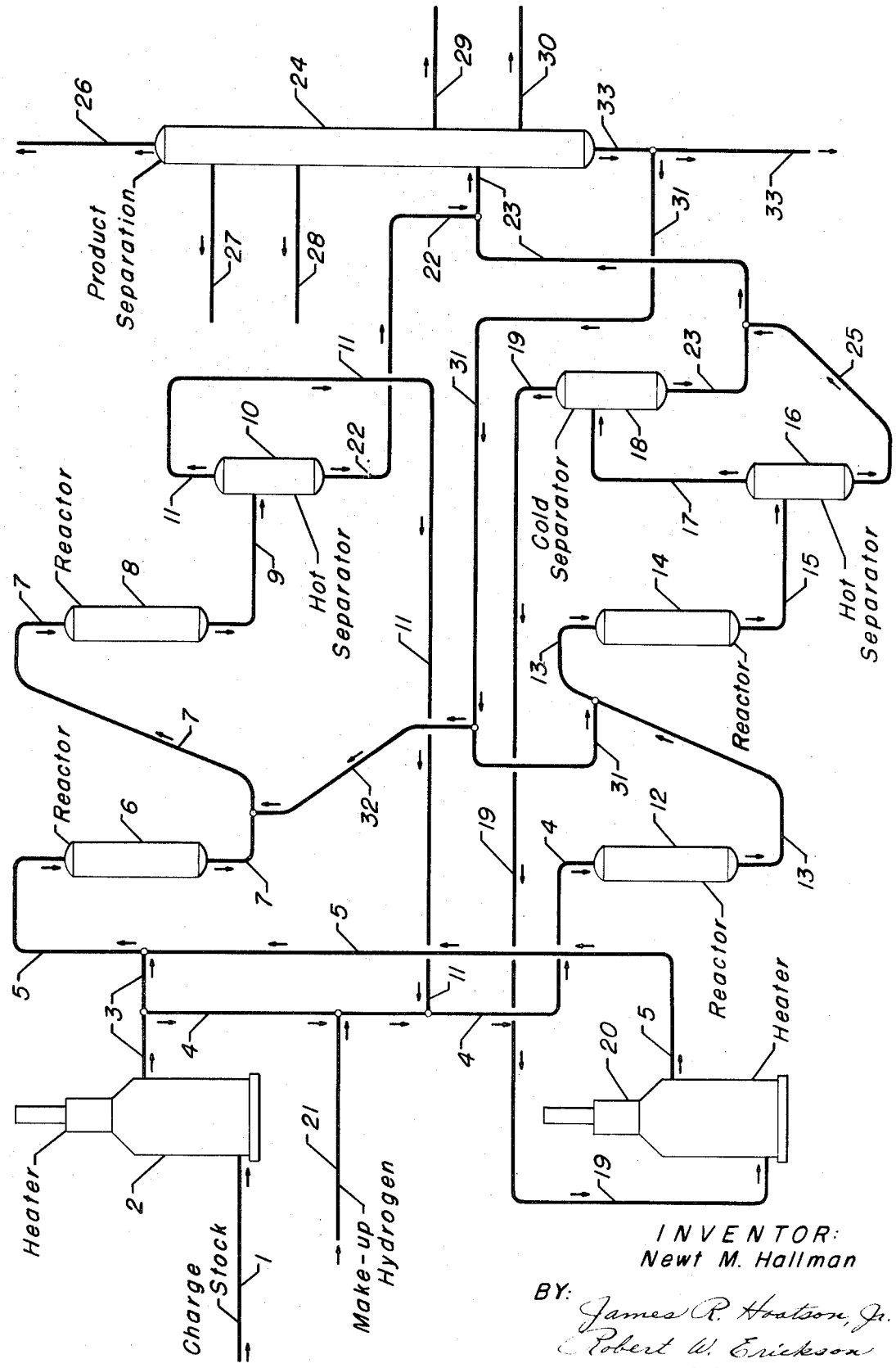

3,691,059
HYDROGEN-CASCADE PROCESS FOR
HYDROCARBON CONVERSION
Newt M. Hallman, Mount Prospect, Ill., assignor to
Universal Oil Products Company, Des Plaines, Ill.
Filed Aug. 24, 1970, Ser. No. 66,522
Int. Cl. C10g 23/00, 37/00
U.S. Cl. 208—80
10 Claims

ABSTRACT OF THE DISCLOSURE

An economical hydrocarbon hydroprocess of modified hydrogen circulation which effects savings in compression by hydrogen cascade in a process requiring the recycling of hydrogen. Particularly directed for utilization hydrocracking, the present process is applicable to the hydrogenation of aromatic nuclei, the ring-opening of cyclic hydrocarbons for the production of jet fuel components, desulfurization, denitrification, hydrogenation, etc. The process involves separately reacting portions of the fresh feed charge stock in individual reaction systems interconnected by way of the flow of circulating hydrogen. A catalytic process wherein the catalytically active metallic components are selected from the metals of Groups V–B, VI–B or VIII.

APPLICABILITY OF INVENTION

The present invention involves a fixed-bed catalytic process for effecting the hydroprocessing of hydrocarbons and mixtures thereof. As utilized herein, the term "hydrotreating" is intended to be synonymous with the term "hydroprocessing" and alludes to the conversion of hydrocarbons at operating conditions which effect the chemical consumption of hydrogen while carrying out the desired reaction or reactions. Processes intended to be encompassed by the term "hydroprocessing" include hydrocracking, aromatic hydrogenation, ring-opening, hydrorefining (for nitrogen removal and olefin saturation), improvement of kerosene fractions for jet fuel production, desulfurization (often included in hydrorefining) and hydrogenation, etc. It will be readily recognized that one common attribute of these processes, and the reactions being effected therein, is that they are "hydrogen-consuming" and are, therefore, exothermic in nature.

Hydroprocessing of hydrocarbons generally requires a catalytic composite possessing both a hydrogenation function and a cracking function. Therefore, the contemplated processes utilize a dual-function catalyst of a porous carrier material and at least one metallic component selected from the metals of Groups V–B, VI–B and VIII of the Periodic Table. Specific details regarding particular catalytic composites are herein further delineated. Catalytic composites having a dual-function are widely employed in many industries for the purpose of accelerating a plethora of hydrocarbon conversion reactions. In general, the cracking function is thought to be associated with an acid-acting material of the porous, adsorptive refractory inorganic oxide type which is utilized as the carrier for one or more catalytically active metallic components to which the hydrogenation function is generally attributed. This is not intended to connote that the metallic components are entirely void of a cracking function; those possessing expertise in the art of catalysis are well aware of the fact that a given metal—i.e. nickel— can foster both cracking and hydrogenation under selected conditions of operation. These catalytic composites serve to promote multitudinous hydrocarbon conversion reactions such as hydrocracking, isomerization, dehydrogenation, hydrogenation, dehydrocyclization, desulfurization, catalytic reforming, ring-opening, aromatization, alkylation and transalkylation, polymerization, cracking, etc., some of which reactions are hydrogen-producing, while others are hydrogen-consuming. In employing the term "hydrogen-consuming," I intend to exclude those processes wherein hydrogen consumption is primarily involved with the saturation of light olefins resulting from undesirable cracking, thereby producing light paraffins, methane, ethane and propane. As hereinabove stated, the inventive concept encompassed by the present invention is applicable to a broad myriad of hydrogen-consuming processes. In the interest of brevity, however, the following discussion will be limited to a process for the conversion of heavy hydrocarbonaceous material into lower-boiling hydrocarbon products.

The selection of a particular catalytic composite, as well as the concentration of metallic components therein, are primarily dependent upon (1) the particular hydroprocess being effected, (2) the physical and chemical characteristics of the fresh feed charge stock and, (3) the intended end result.

With respect to hydrocracking, the present invention is directed toward the multiple-stage conversion of contaminated, heavier-than-gasoline charge stocks including vacuum gas oils, atmospheric gas oils, kerosene fractions, etc. The process is also applicable for the conversion of heavier petroleum crude oil fractions including atmospheric tower bottoms products, crude oil residuum, topped crude oils, crude oils extracted from tar sands, etc., all of which are often referred to in the art as "black oils." It can also be utilized effectively for processing other heavy fractions such as deasphalted gas oils which have extremely high boiling points although void of residual material. Hydrocracking, often referred to as "destructive hydrogenation," is distinguished from the simple addition of hydrogen to unsaturated bonds between carbon atoms since it effects definite changes in the molecular structure of the hydrocarbons being processed. Hydrocracking may, therefore, be designated as cracking under hydrogenation conditions such that the lower-boiling hydrocarbon products of the cracking reactions are substantially more saturated than when hydrogen, or materials supplying the same, is not present. With respect to the foregoing charge stocks, they are generally found to be contaminated by significant quantities of sulfurous and nitrogenous compounds. Additionally, the "black oils" contain high molecular weight, organo-metallic complexes principally comprising nickel and vanadium, asphaltic material and greater quantities of sulfurous and nitrogenous compounds. Currently, an abundant supply of the heavier hydrocarbonaceous material exists, most of which has a gravity less than about 20.0° API. This material is generally further characterized by a boiling range indicating that 10.0% or more, by volume, boils above a temperature of about 1050° F.

My invention is especially adaptable for the catalytic conversion of black oils into distillable hydrocarbon products of lower molecular weight. Specific examples of the black oils to which the present scheme is applicable, include a vacuum tower bottoms product having a gravity of 7.1° API, containing 4.05% by weight of sulfur and 23.7% by weight of asphaltic; a "topped" Middle-East Kuwait crude oil, having a gravity of about 11.0° API, containing 10.1% by weight of asphaltenes and 5.2% by weight of sulfur; and, a vacuum residuum having a gravity of 8.8° API, containing 3.0% by weight sulfur and 4,300 p.p.m. by weight of nitrogen, and having a 20.0% volumetric distillation temperature of about 1055° F.

OBJECTS AND EMBODIMENTS

A principal object of the present invention is to convert heavy hydrocarbonaceous material into lower-boiling hydrocarbon products. A corollary objective is to provide a process wherein hydrogen circulation is simplified in a manner which affords significant economic advantages.

A specific object of my invention resides in the improvement of hydrogen-consuming processes including hydrocracking, hydrorefining, ring-opening for jet fuel production, hydrogenation of aromatic hydrocarbons, desulfurization, denitrification, etc.

To achieve these and other objects, the present invention essentially involves processing individual portions of the charge stock, from about 30.0% to about 70.0%, in separate catalytic reaction systems which are interconnected by a unique hydrogen circulation system.

Therefore, in one embodiment, the present invention provides a process for the conversion of a hydrocarbonaceous charge stock into lower-boiling hydrocarbon products which comprises the steps of: (a) reacting from about 30.0% to about 70.0% of said charge stock and hydrogen in a first catalytic reaction system; (b) separating the resulting first reaction system effluent in a first separation zone at substantially the same pressure and a temperature in the range of about 600° F. to about 800° F., to provide a first hydrogen-rich, principally vaporous phase and a first liquid phase; (c) reacting said first vaporous phase and the remainder of said charge stock in a second catalytic reaction system; (d) separating the resulting second reaction system effluent in a second separation zone, at substantially the same pressure and a temperature in the range of 600° F. to about 800° F., to provide a second hydrogen-rich principally vaporous phase and a second liquid phase; and, (e) recycling at least a portion of said second vaporous phase to combine with said 30.0% to about 70.0% of said charge stock; said process being further characterized in that said first catalytic reaction system contains from about 30.0% to about 70.0% of the total catalyst in said first and second reaction systems.

Other objects and embodiments of my invention relate to additional details regarding preferred catalytic ingredients, the concentration of components within the various catalytic composites, individual operating conditions for use in the various hydrocarbon hydroprocesses, and especially those utilized in the hydrocracking process, preferred processing techniques and similar particulars which are hereinafter given in the following, more detailed summary of my invention.

In one such embodiment, the first and second catalytic reaction systems comprise multiple reaction zones which may contain either different catalytic composites, or the same catalytic composite. Additionally, the second vaporous phase is further separated in third separation zone at substantially the same pressure and a temperature in the range of about 60° F. to about 140° F. and provide a third hydrogen-rich, principally vaporous phase and a third liquid phase; at least a portion of said third vaporous phase is recycled to combine with 30.0% to about 70.0% of said charge stock.

SUMMARY OF INVENTION

As hereinabove set forth, the present invention is directed toward the hydroprocessing of hydrocarbons and mixtures of hydrocarbons, and specifically to the hydrocracking of heavy hydrocarbonaceous material to produce lower-boiling hydrocarbons. Previous experience in hydroprocessing indicates that a preferred technique makes use of a fixed-bed catalytic reaction system. Although the precise character of the catalytic composite will be primarily dependent upon the particular hydroprocess being effected, catalytically active components are geneally selected from the metals of Groups V–B, VI–B and VIII as set forth in the Periodic Table of The Elements, E. H. Sargent and Company, 1964. In many applications the catalyst will also contain a halogen component, and in some applications, an alkali metal or alkaline-earth metal component. Regardless of the process, the catalytically active components are combined with a porous carrier material having a surface area of about 25 to about 500 square meters per gram. The carrier material is necessarily refractory with respect to the operating conditions employed in the particular hydroprocess, and it is intended to include herein those carrier materials which have heretofore been traditionally utilized. In particular, suitable carrier materials are selected from the group of synthetically-prepared, or naturally-occurring amorphous refractory inorganic oxides including alumina, titania, zirconia, magnesia, thoria, boria, silica-alumina, silica-magnesia, chromia-alumina, alumina-silica-boron phosphate, silica-zirconia, etc. When of the amorphous type, a preferred carrier material constitutes a composite of alumina and silica, with silica being present in an amount of about 10.0% to about 90.0% by weight.

In many hydroprocessing applications, the present invention, particularly hydrocracking heavy hydrocarbonaceous material to produce lower-boiling hydrocarbon products, the carrier material will constitute a crystalline aluminosilicate, often referred to as zeolitic in nature. This may be naturally-occurring or synthetically-prepared, and includes mordenite, faujasite, Type A or Type U molecular sieves, etc. The zeolitic material may be in a hydrogen form, or in a form which results from treatment with multivalent cations, or may be combined with amorphous alumina, silica or alumina-silica.

When a crystalline aluminosilicate or zeolitic material is intended for use in the carrier, it is preferred that the same consist of substantially pure crystalline aluminosilicate particles. In employing the term, "substantially pure," the intended connotation is an aggregate particle at least 90.0% by weight is zeolitic.

The precise composition and method of manufacturing either the carrier material or the final catalytic composite, is not considered essential to the present process. Suitable metallic components are those selected from the group consisting of the metals of Groups V–B, VI–B and VIII. Thus, the catalytic composite may comprise one or more metallic components from the group of vanadium, niobium, tantalum, molybdenum, tungsten, chromium, iron, cobalt, nickel, platinum, palladium, iridium, osmium, rhodium, ruthenium and mixtures thereof. The concentration of the catalytically active metallic component or components, is primarily dependent upon the particular metal as well as the characteristics of the charge stock. For example, the metallic components of Group VI–B are preferably present in an amount in the range of about 1.0% to about 20.0% by weight, the Group V–B metals in an amount in the range of about 5.0% to about 15.0% by weight, the iron-group metals in an amount within the range of about 0.2% to about 10.0% by weight, whereas the Group VIII noble metals are preferably present in an amount within the range of about 0.1% to about 5.0% by weight, all of which are calculated as if the components existed within the finished catalytic composite as the elemental metal.

Another ingredient of the catalytic composite may be a halogen component selected from the group of fluorine, chlorine, iodine, bromine, or mixture thereof. Of these fluorine and particularly chlorine are preferred for the hydrocarbon hydroprocesses encompassed by the present invention. The quantity of halogen is such that the final catalytic composite contains about 0.1% to about 3.5% by weight, and preferably from about 0.5% to about 1.5% calculated on an elemental basis.

In those hydroprocesses wherein the acid function of the catalytic composite must necessarily be attenuated, the metallic components will be combined with a carrier material consisting essentially of alumina. In this situation, a halogen component is not combined with the catalytic composite and the inherent acid function of the catalytically active metallic components, as well as the alumina, is further attenuated through the addition of from 0.01% to about 1.5% by weight of an alkalinous metal component. This component is generally selected from the group of lithium, sodium, potassium, rubidium, cesium, barium, strontium, calcium, magnesium, beryllium, mixtures of two or more, etc. In general, more advantageous results are achieved through the use of the alkali metals, and particularly lithium and/or potassium.

Some hydrogen-consuming processes are generally improved when the catalytic composite is subjected to a presulfiding operation designed to incorporate therewith from about 0.05% to about 0.50% by weight of sulfur on an elemental basis. This presulfiding treatment generally takes place in the presence of hydrogen and a suitable sulfur-containing compound such as hydrogen and sulfide, carbon di-sulfide, lower molecular weight mercaptans, organic sulfides, etc.

In accordance with the present invention, the hydrocarbonaceous charge stock and hydrogen are contacted with a catalytic composite of the type described above in a hydrocarbon conversion zone. The contacting may be accomplished by using the catalyst in a fixed-bed system, a moving-bed system, a fluidized-bed system, or in a batch-type operation. However, in view of the risk of attrition loss of the valuable catalyst, it is preferred to use a fixed-bed catalytic system. Furthermore, it is well known, in petroleum refining technology, that a fixed-bed catalytic system offers many operational advantages. In this type of system, a hydrogen-rich gaseous phase and the charge stock are preheated by any suitable means to the desired temperature and are then passed into a conversion zone containing the fixed-bed of the catalyst composite. In a preferred embodiment of my invention, the first and second catalytic reaction systems are preferably multiple-stage zones. The reactants may contact the catalytic composite in either upward, downward, or radial flow fashion with a downward flow being preferred.

The operating conditions imposed upon the various reaction zones are, of course, dependent upon the particular type of hydroprocess being effected. However, these operating conditions will generally include a pressure from about 400 to about 5,000 p.s.i.g., a liquid hourly space velocity of about 0.1 to about 10.0, and a hydrogen concentration within the range of about 1,000 to about 50,000 s.c.f./bbl. In view of the fact that hydroprocessing reactions are exothermic in nature, an increasing temperature gradient is experienced as the hydrogen and feed stock traverse the catalyst bed. For any given hydrogen-consuming process, it is desirable to maintain the maximum catalyst bed temperature below about 900° F. Hydrogen-consuming processes are conducted at a temperature in the range of about 200° F. to about 900° F. and it is intended herein that the stated temperature of operation alludes to the maximum catalyst bed temperature. In order to assure that the catalyst bed temperature does not exceed the maximum allowed for a given process, quench streams, either normally liquid, or normally gaseous and introduced at one or more intermediate loci of the catalyst bed, may be utilized. In the preferred embodiment of hydrocracking, that portion of the normally liquid product effluent boiling above the end boiling point of the desired product slate may be recycled either to combine with the fresh hydrocarbon charge stock, or utilized as the quench liquid. In such situations, the combined liquid feed ratio (defined as volumes of total liquid charge per volume of fresh feed charge) will be within the range of about 1.1 to about 6.0. It is not, however, a necessary feature of my invention that any liquid recycle be employed to either of the reaction systems.

Hydrocracking reactions are generally effected at elevated pressures in the range of about 1,000 to about 5,00 p.s.i.g., and liquid hourly space velocities of about 0.5 to about 5.0. The hydrogen circulation rate will be at least about 3,000 s.c.f./bbl., with an upper limit of about 50,000 s.c.f./bbl. based only upon fresh feed to the reaction system. Operating temperature again alludes to the maximum temperature of the catalyst within the reaction zone, and is in the range of about 600° F. to about 900° F.

Before describing my invention with reference to the accompanying drawing, and illustrating the manner in which it facilitates the hydroprocessing of hydrocarbons, several definitions are believed necessary in order that a clear understanding is afforded. In the present specification and appended claims, the phrase "pressure substantially the same as" is intended to connote that pressure under which a downstream vessel is maintained, allowing only for the pressure drop experienced as a result of the flow of fluids through the system. For example, where the conversion zone pressure, measured at the inlet thereof, is 2,650 p.s.i.g., the hot separator will function at about 2,530 p.s.i.g. and the cold separator at a pressure of about 2,490 p.s.i.g. Thus, no specific intentional means are employed to reduce a pressure. Similarly, unless otherwise specified, the phrase "temperature substantially the same as" is used to indicate that the only reduction in temperature stems from the normal loss due to flow from one piece of equipment to another.

DESCRIPTION OF DRAWING

In the drawing, the illustrated embodiment is presented by means of a simplified flow diagram in which such details as pumps, instrumentation and controls, heat-exchange and heat-recovery circuits, valving, start-up lines and similar hardware have been omitted as being non-essential to an understanding of the techniques involved. The use of such miscellaneous appurtenances, to modify the process, are well within the purview of one reasonably skilled in the art.

For the purpose of demonstrating the illustrated embodiments, the drawing will be described in connection with a commercially-scaled unit designed to process about 40,000 bbl./day of a reduced Middle-East Kuwait crude stock. It is understood that the charge stock, stream compositions, operating conditions, vessel designs, separators and the like are exemplary only, and may be varied widely without departure from the spirit of my invention, the scope of which is defined by the appended claims. With reference now to the drawing, the charge stock, having the properties set forth in the following table is introduced into the process by way of line 1.

TABLE I: REDUCED CRUDE PROPERTIES

| | |
|---|---|
| Gravity, ° API | 16.6 |
| Specific gravity | 0.9554 |
| Initial boiling point, ° F. | 650 |
| 50.0% distillation temperature, ° F. | 925 |
| Sulfur, wt. percent | 3.80 |
| Nitrogen, p.p.m. | 2,100 |
| Heptane-insolubles, wt. percent | 2.90 |

The desired object resides in the maximum production of a normally liquid product stream containing less than 1.0% by weight of sulfur. After appropriate heat-exchange with hot effluent streams, the charge stock enters heater 2 wherein the temperature is increased to a level of about 650° F. The heated charge stock is withdrawn by way of line 3, and about one-half, or 20,000 bbl./day, is diverted via line 4. The remaining 20,000 bbl./day continues through line 3, is admixed with hot recycled hydrogen in line 5, the source of which is hereafter set forth, and is introduced therethrough into reactor 6. Reactors 6 and 8 constitute the previously referred to "first reaction system." In the instant illustration, reactor 6 contains about 4,680 cubic feet of catalyst, as do reactors 8, 12 and 14. The latter two reactors make up the previously referred to "second reaction system." Thus, of the total catalyst disposed in all four reactors, about 50.0% is contained in each of the two reaction systems.

Referring again to reactor 6, the catalyst disposed therein is a composite of an amorphous alumina-silica carrier material (88.0% by weight alumina), 1.8% nickel and 16.0% molybdenum, calculated as the elemental metals. In the present illustration, the same catalytic composite is also disposed in reactors 8, 12 and 14. The liquid hourly space velocity, defined as volumes of fresh feed charged per hour, per volume of catalyst, is about 0.5 and the hydrogen concentration is 5,000 scf./bbl., based upon fresh feed charge. The focal point, in the entire process, for pressure control is cold separator 18 and, in this case, the pressure is controlled to maintain the cold separator at 2,000 p.s.i.g. Thus, reactors 6, 8, 12 and 14 will function at successively decreasing pressures, all of which will be above about 2,000 p.s.i.g., with reactor 6 being at the highest pressure level.

The product effluent, at a temperature of about 700° F., is withdrawn via line 7 and is admixed with a recycled quench in line 32, the source of which is hereafter set forth, in an amount to reduce the temperature of the effluent. The mixture continues through line 7 into reactor 8, and initially contacts the catalyst therein at a temperature of about 650° F. The increasing temperature gradient is controlled at about 50° F. through the utilization of hydrogen quench. Since the increasing temperature gradient is held to a relatively low level, the effluent can be withdrawn by way of line 9 at a temperature of about 700° F., and introduced thereby, at substantially the same temperature into hot separator 10.

Hot separator 10 serves the primary function of providing a hot, hydrogen-rich principally vaporous phase in line 11 which is combined with the second one-half of the fresh feed charge stock in line 4, serving as the combined charge to the second reaction system. The mixture continues through line 4 into reactor 12. Although make-up hydrogen, from any suitable external source—i.e. a hydrogen-producing catalytic reforming process—may be introduced at any suitable location, to supplant that consumed in the overall process and "lost" by way of dissolution in the normally liquid product stream, a preferred locus is with fresh feed in line 4, either after, or prior to combining the vaporous phase in line 11 therewith; in the present illustration, make-up hydrogen is indicated as entering the process by way of line 21. With respect to the commercially-scaled unit under discussion, the make-up hydrogen is somewhat more than 623 s.c.f./bbl. (the amount chemically consumed) to account for solution loss.

Reactor 12 contains the same type of catalyst as reactor 6, although, as hereinbefore stated, this is not an essential feature. The inlet temperature of the catalyst bed is about 650° F., and the liquid hourly space velocity is 0.5. The product effluent, again at a temperature of about 700° F., is withdrawn through line 13, admixed with a recycled quench from line 31, and introduced thereby into reactor 14.

The catalyst bed inlet temperature is 650° F., and the increasing temperature gradient is again controlled at a level which maintains the maximum catalyst bed temperature at about 700° F. At substantially the same temperature and pressure, the effluent in line 15 is introduced nto hot separator 16 to provide a second hydrogen-rich, principally vaporous phase in line 17. After use as a heat-exchange medium and further cooling to a temperature in the range of from 60° F. to 140° F.—i.e. 100° F.—the vaporous phase passes into cold separator 18, the focal point for pressure control within the process.

Cold separator 18 serves to effect further concentration of the hydrogen through the removal of condensed normally liquid hydrocarbons via line 23. These are introduced into product separation means 24 along with the principally liquid phases, in lines 22 and 25, from hot separators 10 and 18, respectively. The enriched hydrogen stream is withdrawn from cold separator 18 through line 19 by compresive means not illustrated. Also not illustrated is the commonly employed pressure control valve, normally installed in line 19 for the purpose of venting a portion of the vaporous phase in order to control the cold separator pressure at the desired level, in this case, 2,000 p.s.i.g. Prior to being recycled via compressive means, the vaporous phase in line 19 may be treated and/or additionally separated to remove hydrogen sulfide and other normally gaseous components in order to further increase the hydrogen concentration. In any event, the hydrogen-rich stream is recycled through line 19 into heater 20, wherein the temperature is raised to the extent necessary to maintain the desired inlet temperature in reactor 6. The heated hydrogen enters reactor 6 through line 5, after being admixed therein with 20,000 bbl./day of fresh feed from line 3.

With respect to product separation means 24, although indicated as a single vessel, it is understod that the desired product streams can be recovered in any suitable fashion utilizing one or more fractionators, rectifiers, flash zones, etc. A typical separation is illustrated wherein butane and lighter, normally gaseous material is withdrawn as an overhead stream in line 26. A pentane-158° F. (end point) fraction is removed from line 27, while a 158° F.–374° F. naphtha is withdrawn by way of line 28. Other product streams include a 374° F.—536° F. kerosene cut, line 29, a 536° F.–650° F. light gas oil, line 30, and a 650°-plus heavy gas oil, line 33. Not illustrated in the drawing, since it is a standard refinery technique, is a vacum column into which the liquid phases from lines 22, 23 and 25 are introduced in order to remove a heavy bottoms prior to final product separation as above set forth.

With respect to the heavy gas oil in line 33, a portion is diverted through line 31 to serve as quench liquid for the effluent from reactors 6 and 12. Many modifications to the foregoing may be made by those having expertise in the art without removing the resulting flow from the scope of my invention as set forth in the appended claims. One such modification involves recycling a portion of the heavy gas oil to the inlet of reactors 6 and 12.

Product distribution and component yields are presented in the following Table II, and are inclusive of the total hydrogen consumed, 0.99% by weight of the fresh feed charge stock.

TABLE II
Product Distribution and Yield

| Component | Weight percent | Volume percent |
| --- | --- | --- |
| Ammonia | 0.11 | |
| Hydrogen sulfide | 3.03 | |
| Methane | 0.09 | |
| Ethane | 0.12 | |
| Propane | 0.14 | |
| Butanes | 0.15 | 0.25 |
| Pentane, °F.: | | |
| 158 | 0.14 | 0.21 |
| 158–374 | 1.55 | 1.95 |
| 374–536 | 2.48 | 2.92 |
| 536–650 | 2.05 | 2.29 |
| 650-plus | 68.13 | 72.45 |
| Vacuum bottoms | 23.00 | 22.14 |

It should be noted that these results are obtained with minimal (0.35% by weight) "loss" to normally gaseous paraffins. With respect to the pentane-158° F. fraction, the gravity is 85.9° API and the sulfur concentration is 0.03% by weight. Analyses of the other several product streams, with exception of the vacuum bottoms, are presented in Table III.

TABLE III.—PRODUCT ANALYSES

| Stream | 158°–374° | 374°–536° | 536°–650° | 650°–plus |
| --- | --- | --- | --- | --- |
| Gravity, °API | 55.0 | 43.0 | 33.8 | 26.0 |
| Paraffins, vol. percent | 46.0 | | | |
| Naphthenes, vol. percent | 42.0 | | | |
| Aromatics, vol. percent | 12.0 | | | |
| Sulfur, wt. percent | 0.05 | 0.20 | 0.30 | 0.60 |

As hereinbefore set forth, the two individual reaction systems are interconnected by a unique hydrogen flow system. Referring briefly once again to the drawing, starting with the vaporous phase from cold separator 18, the focal point for process pressure control, the hydrogen flows, utilizing a single compressor, in the manner following: line 19 to heater 20; line 5 to reactor 6; line 7 to reactor 8; line 9 to hot separator 10; line 11 and line 4 to reactor 12; line 13 to reactor 14; line 15 to hot separator 16; and, finally, line 17 to cold separator 18. The principal advantage of the present process stems from the fact that only approximately one-half the volume of hydrogen need be compressed, as compared to conventional schemes wherein the fresh feed is not split, while maintaining a desired and necessary hydrogen to oil ratio in the reaction zones. Another advantage, with respect to the two reaction systems, stems from the fact that the process possesses inherent flexibility not found in present day processes. Thus, for example, the first reaction system can process 70.0% (or any other quantity down to 30.0%) of the feed at an operating severity selected to maximize gasoline production, while the second reaction system, processing the remainder of the fresh feed, can function at a severity level which maximizes the production of a jet fuel boiling range fraction.

I claim as my invention:

1. A process for the conversion of a hydrocarbonaceous charge stock into lower-boiling hydrocarbon products which comprises the steps of:
   (a) reacting from about 30.0% to about 70.0% of an aliquot of said charge stock and hydrogen in a first catalytic reaction system;
   (b) separating the resulting first reaction system effluent in a first separation zone, at substantially the same pressure and a temperature in the range of 600° F. to about 800° F., to provide a first hydrogen-rich, principally vaporous phase and a first liquid phase;
   (c) reacting said first vaporous phase and the remainder of said charge stock in a second catalytic reaction system;
   (d) separating the resulting second reaction system effluent in a second separation zone, at substantially the same pressure and a temperature in the range of 600° F. to about 800° F., to provide a second hydrogen-rich, principally vaporous phase and a second liquid phase; and,
   (e) recycling at least a portion of said second vaporous phase to combine with said 30.0% to about 70.0% of said charge stock;

said process further characterized in that said first catalytic reaction system contains from about 30.0% to about 70.0% of the total catalyst in said first and second reaction systems.

2. The process of claim 1 further characterized in that at least a portion of said second liquid phase is recycled to said first catalytic reaction system.

3. The process of claim 1 further characterized in that at least a portion of said second liquid phase is recycled to said second catalytic reaction system.

4. The process of claim 1 further characterized in that the portion of said second phase which is recycled is at least a portion of a hydrogen-rich principally vaporous third phase obtained by separating said second vaporous phase in a third separation zone at substantially the same pressure as the second separation zone and a temperature in the range of 60° F. to about 140° F. to provide said third hydrogen-rich vaporous phase and a third liquid phase.

5. The process of claim 4 further characterized in that said first, second and third liquid phases are separated to provide a fourth liquid phase, and at least a portion of the latter is recycled to said first catalytic reaction system.

6. The process of claim 5 further characterized in that at least a portion of said fourth liquid phase is recycled to said second catalytic reaction system.

7. The process of claim 1 further characterized in that make-up hydrogen, to supplant that consumed in the process, is introduced into said second catalytic reaction system.

8. The process of claim 1 further characterized in that the reaction conditions imposed upon said first and second catalytic reaction systems include a maximum catalyst bed temperature of 600° F. to about 900° F., a pressure in the range of about 1,000 to about 4,000 p.s.i.g., a hydrogen concentration of about 3,000 to about 50,000 s.c.f./bbl. and a liquid hourly space velocity in the range of 0.5 to about 5.0.

9. The process of claim 1 further characterized in that the catalytic composites disposed within said first and second reaction systems comprise a porous carrier material and at least one metallic component from the metals of Groups V-B, VI-B or VIII.

10. The process of claim 1 further characterized in that said first and second catalytic reaction systems comprise multiple reaction zones having at least two different catalytic composites in at least two of said zones.

References Cited
UNITED STATES PATENTS

| | | | |
|---|---|---|---|
| 3,364,134 | 1/1968 | Hamblin | 208—93 |
| 3,293,169 | 12/1966 | Kozlowski et al. | 208—86 |
| 3,444,072 | 5/1969 | Lehman | 208—102 |

DELBERT E. GANTZ, Primary Examiner

G. E. SCHMITKONS, Assistant Examiner

U.S. Cl. X.R.

208—111; 260—672 R